(12) United States Patent
Dominik et al.

(10) Patent No.: US 12,068,647 B2
(45) Date of Patent: Aug. 20, 2024

(54) COIL MODULE FOR AN ELECTRIC MACHINE

(71) Applicant: Vaionic Technologies GmbH, Berlin (DE)

(72) Inventors: Yannick Dominik, Berlin (DE); Jörg Berthelmann, Berlin (DE); Georg Franz, Berlin (DE)

(73) Assignee: Vaionic Technologies GmbH, Berlin (DE)

( * ) Notice: Subject to any disclaimer, the term of this patent is extended or adjusted under 35 U.S.C. 154(b) by 0 days.

(21) Appl. No.: 17/750,728

(22) Filed: May 23, 2022

(65) Prior Publication Data

US 2022/0376573 A1  Nov. 24, 2022

Related U.S. Application Data

(60) Provisional application No. 63/191,442, filed on May 21, 2021, provisional application No. 63/191,450, filed on May 21, 2021.

(51) Int. Cl.
*H02K 3/18* (2006.01)
*H02K 3/04* (2006.01)
(Continued)

(52) U.S. Cl.
CPC .............. *H02K 3/18* (2013.01); *H02K 3/04* (2013.01); *H02K 3/38* (2013.01); *H02K 9/19* (2013.01)

(58) Field of Classification Search
CPC ............ H02K 1/14; H02K 21/24; H02K 3/04; H02K 3/18; H02K 3/24; H02K 3/38;
(Continued)

(56) References Cited

U.S. PATENT DOCUMENTS 6,040,650 A    3/2000  Rao
7,514,826 B2*  4/2009  Wakita ............... H02K 3/24
                                                    310/201
(Continued)

FOREIGN PATENT DOCUMENTS

DE   10 2017 204 072 A1   9/2018
EP         3460957 A1     3/2019
(Continued)

OTHER PUBLICATIONS

EP-3813237-A1, Dominik, all pages (Year: 2021).*
(Continued)

*Primary Examiner* — Naishadh N Desai
(74) *Attorney, Agent, or Firm* — Westman, Champlin & Koehler, P.A.

(57) ABSTRACT

The present invention relates to a coil module for an electric machine, comprising: a first coil disc having at least one winding of an electrically conductive material; a second coil disc having at least one winding of an electrically conductive material; wherein the first coil disc and/or the second coil disc comprise/comprises a substantially annular recess; wherein the first coil disc and the second coil disc are attached to each other such that a substantially annular cooling channel for a coolant is formed between the first coil disc and the second coil disc by the substantially annular recesses/recess.

15 Claims, 8 Drawing Sheets

(51) Int. Cl.
*H02K 3/38* (2006.01)
*H02K 9/19* (2006.01)

(58) Field of Classification Search
CPC ...... H02K 3/47; H02K 9/19; F02B 2075/025; C12Q 1/6848; C12Q 1/6869; C12Q 1/6874; C12Q 2527/125; C12Q 2527/127; C12Q 2535/113; C12Q 2535/122; C12Q 2537/143; C12Q 2563/107
See application file for complete search history.

(56) References Cited

U.S. PATENT DOCUMENTS

| | | | | |
|---|---|---|---|---|
| 7,795,773 | B1 | 9/2010 | Wittig | |
| 8,476,800 | B2* | 7/2013 | Lai | H02K 3/28 |
| | | | | 310/179 |
| 8,558,425 | B2* | 10/2013 | Stahlhut | H02K 3/26 |
| | | | | 310/268 |
| 11,201,516 | B2* | 12/2021 | Schuler | H02K 3/26 |
| 2008/0100166 | A1 | 5/2008 | Stahlhut et al. | |
| 2011/0285224 | A1* | 11/2011 | Iki | H02K 3/47 |
| | | | | 310/64 |
| 2020/0220406 | A1* | 7/2020 | Schuler | H02K 1/2798 |
| 2020/0227991 | A1 | 7/2020 | Boettcher | |

FOREIGN PATENT DOCUMENTS

| | | | |
|---|---|---|---|
| EP | 3 813 237 A1 | 4/2021 | |
| EP | 3 813 238 A1 | 4/2021 | |
| EP | 3813237 A1 * | 4/2021 | ............ H02K 16/00 |
| WO | 2012128646 A1 | 9/2012 | |

OTHER PUBLICATIONS

European Search Report dated Aug. 4, 2020, for corresponding European Application No. 20 15 3605, 2 pages.
European Search Report dated Mar. 31, 2020, for corresponding European Application No. 19 20 5443, 2 pages.

* cited by examiner

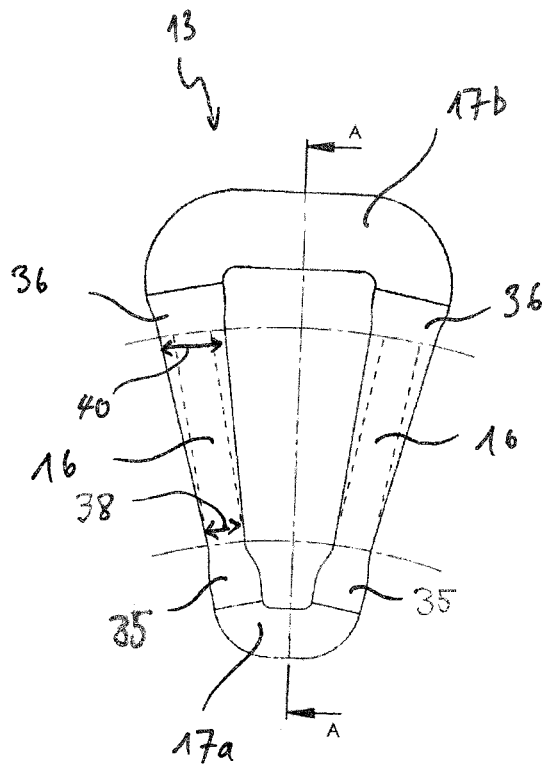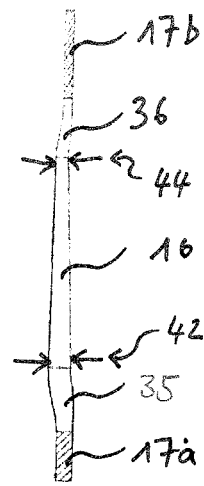
Fig. 9A    Fig. 9B
SCHNITT A-A
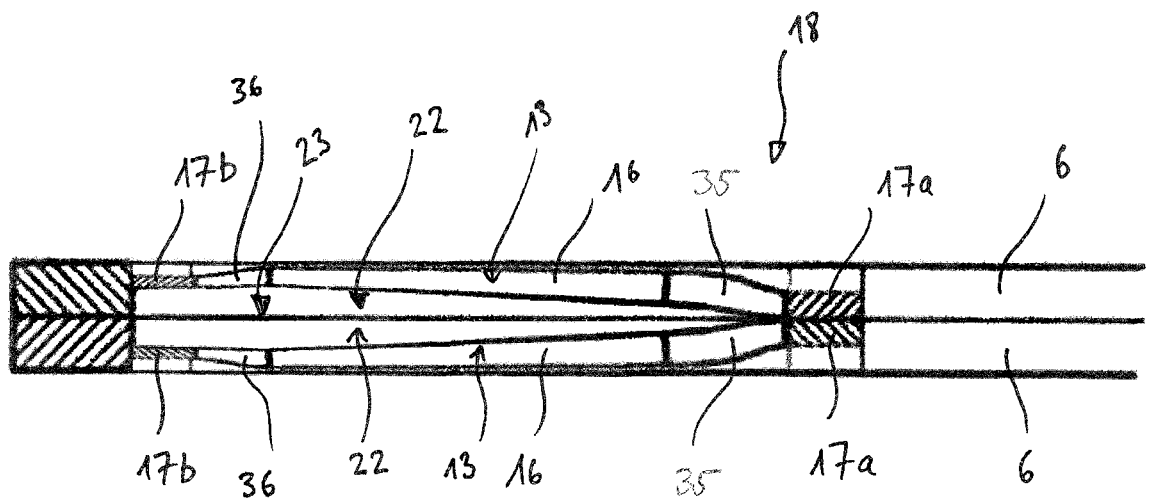
Fig. 10

COIL MODULE FOR AN ELECTRIC MACHINE

CROSS-REFERENCE TO RELATED APPLICATION(S)

This application claims priority to U.S. provisional application Nos. 63/191,450 and 63/191,442, both filed on May 21, 2021, the contents of which are hereby incorporated by reference in their entireties.

BACKGROUND

The present invention relates to a coil module for an electric machine.

Electric machines of various designs are known from the prior art. Document DE 10 2017 204 072 A1 describes a type of winding in a meander configuration for an electric motor in which a high density of electrically conductive material is ensured in the area of a magnetic field generated by permanent magnets. However, the flat wire used in this type of structure is disadvantageous due to its electromagnetic characteristics, which lead to inefficiency. In addition, a multi-phase structure turns out to be difficult.

SUMMARY

Therefore, the present invention is based on the object of suggesting a coil module for an electric machine by means of which these disadvantages are overcome and a compact structure with reduced space requirements can be achieved. A further object underlying the invention is to provide effective, space- and/or weight-saving cooling for the electric machine.

In the context of the invention, an electric machine is understood to mean a device which converts electrical energy into mechanical work or vice versa. The term "electric machine" can be in particular understood to mean an electric power machine or an electric motor or an electric generator.

One, more or all of these objects are achieved according to the invention by a coil module as disclosed in the following, an electric machine as disclosed in the following and/or a vehicle or tool as disclosed in the following.

A coil module for an electric machine comprises at least one coil disc. The coil disc in turn comprises a coil carrier made of an electrically insulating material and a plurality of individual windings made of an electrically conductive material, typically in wire form. The windings are circumferentially arranged on the at least one coil disc around a center of the at least one coil disc. Each of the windings comprises two active regions extending radially from the center and two passive regions extending tangentially at its radially outer and inner edges. In a top view of the at least one coil disc, the active regions of different windings do not overlap each other, but each passive region of one of the windings partially overlaps the corresponding passive regions of the two directly adjacent windings. In cross-section, a thickness of the respective winding in the axial direction is greater in the active regions than in the passive regions of the respective winding.

Although a plurality of individual windings are referred to in the context of the present application, several individual electrical windings, e.g., individual windings of the same phase, can be connected to each other.

The active regions can be understood to mean the regions of the windings which are suitable to contribute to the torque of the electric machine and/or are located in the magnetic field of at least one adjacent magnet module of the electric machine. Accordingly, the passive regions of the windings are not suitable to contribute to the torque of the electric machine and/or are not located in the magnetic field of an adjacent magnet module of the electric machine.

In the context of the present application, the term "thickness of the respective winding in the axial direction" or "thickness in the axial direction" of the winding is understood to mean the thickness of the winding which is measured in the axial direction. Similarly, the term "width in the tangential direction or the radial direction" of the winding is understood to mean the width of the winding which is measured in the tangential direction or the radial direction. That is, the indication "in the axial direction", "in the tangential direction" and "in the radial direction" and comparable indications indicate the direction along which the respective quantity (e.g., thickness, width) is measured.

Due to the partial overlap in the passive regions, an amount of electrically conductive material, preferably copper, in the passive regions is typically twice that in the active regions. In order to prevent thickening of the coil disc and of a coil module formed from at least one coil disc in the axial direction, the thickness in the axial direction in cross-section is greater in the active regions than in the passive regions so that a compact structure is ensured. In this context, an electrically insulating material is intended to mean a material having an electrical conductivity of less than $10^{-8}$ S/m at a temperature of 25° C. In this context, an electrically conductive material is intended to mean any material whose electrical conductivity is greater than $10^6$ S/m at a temperature of 25° C. In accordance with common conventions, a radial direction is intended to mean in the context of the present invention the direction extending in a straight line from the center to the edge, and a tangential direction is correspondingly intended to mean the direction extending at a right angle to the radial direction. In the context of the present application, the passive regions can be understood to mean those regions of the windings which do not extend radially and which connect the two active regions of the respective individual winding to each other. However, the passive regions do not have to be exactly tangential. For example, the passive regions can also comprise preferably short radially extending regions which are adjacent to the active regions and in which, for example, a change in cross-section occurs. Due to the fact that the cross-section of the circumferentially arranged windings changes between active regions and passive regions, an axial distance of the air gap between magnetic discs can be varied and thus a relative copper filling ratio can be increased. In addition, a three-phase arrangement of the windings can be accommodated more easily due to the reduced thickness in the passive regions. In the context of the present application, a top view is intended to mean a view along a normal vector of the at least one coil disc, and a side view is correspondingly intended to mean a position angled by 90° with respect to the top view. The normal vector is to start from the area in which the length and the width of the at least one coil disc are greater than a thickness of the at least one coil disc. In the electric machine, the normal vector is thus parallel to the axis of rotation. The windings, also referred to as coils, are preferably provided as coreless windings or windings without iron core. In the context of the present application, the term "coil carrier" is intended to mean in particular a carrier for windings or coils which typically mechanically connects the windings and preferably is made of an epoxy resin or other temperature-resistant plastic. In the context of the present application, the term "coil disc" is intended to mean a corresponding ring comprising the coils or windings and being fixed by the coil carrier, while the term "coil module" is intended to denote a complete mounting part comprising at least one coil disc, but typically two or more coil discs.

For example, the plurality of individual windings can be molded into the material of the coil carrier, preferably epoxy resin, and thus form the coil disc.

A ratio of the thickness of the respective winding in the passive regions to the thickness in the active regions can be less than 1. Preferably, the ratio is greater than or equal to 0.3 and less than 1, and in the case of outer passive regions particularly preferably exactly 0.5, in order to take advantage of the greater available space and to create a uniform relative thickness with the active region of equal to 1 when the coil disc is looked at.

Typically, the shape of the cross-sectional area of the respective winding changes at a transition from an active region to a passive region. Preferably, a surface area of the cross-sectional area remains the same and a fill factor becomes maximum, which can occur, for example, during a pressing operation, but more material can be flown through by the magnetic field lines due to the changed shape and thus the drive can be rendered more efficient. Due to the changed shape, the space available for the electrically conductive material can be used in the electric machine while the magnet distance remains the same, and thus the performance and efficiency can be increased accordingly.

It can be provided that all active regions of different windings, typically of all windings, are arranged in and/or intersect a single plane in a side view.

This plane can be orthogonal to the axial direction of the coil disc and/or the electric machine. It should further be taken into account that the active regions, e.g., in the fanned-out embodiment, can have a varying thickness so that their upper and/or lower surfaces do not have to be parallel to the plane in certain cases. Preferably, the active regions are configured such that they intersect the plane. An individual active region or a few active regions can be excluded therefrom, in which, for example, the bar and/or rib described herein is formed.

This means that the active regions of the different windings can all be arranged at the same height in a side view in the direction along the normal vector of the coil disc so that, e.g., no active region protrudes with respect to the other active regions. An individual active region or a few active regions can be excluded therefrom, in which, for example, the bar and/or rib described herein is formed.

The arrangement in a single plane ensures that all active regions are equally located in the magnetic field of a magnet module. Alternatively, it is preferred that almost all, preferably all but one, of the active regions of the different windings are all arranged at the same height in a side view in the direction along the normal vector of the coil disc so that, e.g., only a small number of active regions, preferably one active region, protrudes with respect to the other active regions. For example, the bar and/or rib described herein can be arranged in this region.

Preferably, the thickness in the axial direction of the active regions of the respective windings decreases in the radial direction towards the outside. Furthermore, the width in the tangential direction of the active regions of the respective windings increases in the radial direction towards the outside.

In other words, the active regions are fanned out towards the outside.

This fanning out of the active regions makes it possible to install more conductive material in the respective windings while the thickness in the axial direction of the coil disc remains the same. This in turn leads to a more powerful electric machine and/or a higher efficiency of the electric machine.

However, this fanning out does not have to be present in the entire active regions of the windings. For example, the active regions adjacent to the passive regions can comprise respective transitions that are excluded from this fanning out.

Preferably, the cross-sectional area of the active regions remains constant along the radial direction.

Typically, the windings are formed from a fine strand of a plurality of wires electrically insulated from each other, wherein the wires electrically insulated from each other have a wire diameter of less than or equal to 0.1 mm. By means of a plurality of strands provided with an electrically insulating coating, sufficient flexibility of the winding formed from the wire can be ensured during production as well as a sufficiently high electrical conductivity can be achieved.

A number of the windings preferably corresponds to an integer multiple of three so that the windings enable a three-phase operation. Thus, a total of three strands of different phases are formed from the windings. In a particularly preferred manner, all active regions of the windings of all phases are located in a single plane in a side view, while the passive regions of the different phases are distributed over two planes. Typically, the passive regions of two phases are in one plane and the passive regions of the third phase perform an additional plane change. The two planes are typically different from each other and/or offset, but parallel to each other.

It can be provided that all windings are identically designed, i.e. in particular have identical dimensions and shapes. Alternatively, it can also be provided that at least one winding that differs in shape or thickness from the remaining windings is used.

The coil disc can be configured such that an inner passive region and an outer passive region of one of the windings differ in thickness in the axial direction. In this context, the inner passive region is arranged at a smaller distance from the center of the coil disc and the coil module than the outer passive region. Typically, the thickness of the outer passive region of one of the windings is selected such that a ratio of the thickness of this region to the thickness of the active regions is less than or equal to 0.5. For the inner passive region, it can be provided that the ratio of the thickness of this inner passive region to the thickness of the active regions is less than 1. In this way, the cooling surface can be extended from the active regions to the outer passive regions.

The invention further relates to an electric machine comprising a bearing arrangement and a shaft guided in the bearing arrangement, wherein at least one magnet module comprising a plurality of permanent magnets and at least one coil module disclosed within the scope of the present application are concentrically arranged along the shaft.

The electric machine such as an electric motor or an electric generator comprises a bearing arrangement and a shaft guided in the bearing arrangement. At least one magnet module comprising a plurality of permanent magnets and at least one coil module exhibiting the above described properties are concentrically arranged along the shaft, wherein the magnet module is attached to the shaft and the coil module is connected to a housing. Due to the high packing density of the windings, a particularly advantageous efficiency and power density is achieved during the operation of the electric machine.

A film or foil made of an electrically insulating material can be adhered to the at least one coil module at least on its side facing the magnet module in order to prevent liquid from passing therethrough and in order to enable cooling channels to be formed. Instead of an adhesive connection, the film or foil can also be applied by means of another connection such as a welded connection as a substance-to-substance bond or a non-positive or friction-locked connection, for example by means of a screwed-on ring.

In order to efficiently cool the electric machine and in particular the active regions, the at least one coil module can comprise at least two coil discs connected to each other and a cooling channel formed by a cavity between the two coil discs. Alternatively or additionally, the cooling channel can be formed and confined by the coil disc or the coil module and the film or foil.

The invention further relates to a vehicle or a machine tool or a tool comprising an electric machine as disclosed within the scope of the present application.

One, more or all of the objects underlying the invention are achieved according to the invention by the coil module, the electric machine and/or the vehicle or the machine tool disclosed in the following.

Since the coil module described in the following includes several features also disclosed in connection with the coil module described above, technical effects, advantages and explanations described above also apply to corresponding features described in the following. In particular, it is to be noted that the coil module described in the following can preferably include any of the features described above in connection with the coil module.

The coil module comprises a first coil disc comprising at least one winding of an electrically conductive material and a second coil disc comprising at least one winding of an electrically conductive material. The first coil disc and/or the second coil disc comprise/comprises a substantially annular recess. The first coil disc and the second coil disc are further attached to each other such that a substantially annular cooling channel for a coolant is formed between the first coil disc and the second coil disc by the annular recesses/recess.

The coil module, the first coil disc, the second coil disc as well as the windings of the first and second coil discs can be configured as disclosed above.

A substantially annular recess can be understood to mean a recess extending around substantially the entire circumference of the coil disc. The indication "substantially" means that the recess comprises, for example, one bar and/or rib (or more bars and/or ribs) described in more detail in the following, which interrupts the substantially annular recess. The substantially annular recess can extend around a center of the coil disc and does not have be at the center of the coil disc. The center of the coil disc is understood to mean the point of the coil disc through which the axis of rotation of the shaft or electric machine passes.

The radially outer and/or the radially inner edge of the substantially annular recess can be circular in a top view (i.e., a view orthogonal to the longitudinal and width directions) of the coil disc. In this regard, the radially outer edge and radially inner edge of the recess each denote the transition from the substantially planar surface of the coil disc to the substantially annular recess. However, the shape of the outer and/or inner edge can also deviate from an exact circular shape. For example, the outer and/or inner edge can be corrugated. Furthermore, the outer and/or inner edge can also have a polygonal shape.

The recess can have a rectangular cross-section with two opposite side surfaces and a bottom surface. Alternatively, the recess can also have a trapezoidal cross-section in which the distance of the opposite side surfaces decreases towards the bottom surface. Furthermore, the recess can also have a circular arc cross-section or a curved cross-section.

In other words, the annular recess can be understood to mean a substantially annular depression in the coil disc. The coil disc can have a smaller thickness in the region of the substantially annular recess than in regions outside the annular recess.

Preferably, the coil disc is manufactured by molding the at least one winding into the electrically insulating material, e.g., epoxy resin. For this purpose, the windings can be placed in a mold which is subsequently filled with the electrically insulating material. Subsequently, the substantially annular recess can be produced in a pressing operation, for example, by means of a substantially annular mold or a punch.

The mold in which the at least one winding is placed can have projections which keep the gaps between the active regions of the windings free, so that the coil disc comprises air gaps between the active regions in a substantially annular region in which the active regions of the windings are located. The coil disc comprising these gaps can be particularly suitable for air cooling of the electric machine, wherein also another form of cooling, for example by means of a coolant (e.g., water-glycol mixture), is preferred.

In the case of the fanned-out active regions described herein, these projections in the mold can preferably be omitted so that the distances between the active regions can be very small and no gaps remain between the active regions after the molding step.

However, the substantially annular recess can also be produced by other methods. For example, the mold itself into which the electrically insulating material is embedded can define the recess so that no subsequent pressing operation is required. Furthermore, the substantially annular recess can be produced, for example, by milling.

Such a substantially annular recess can be provided in one of the first and/or second coil disc. Preferably, a substantially annular recess is provided in each of the first and second coil discs.

As already mentioned, in the context of the present application, a disc is understood to mean a body whose length and width or whose diameter are or is significantly greater than its thickness, e.g., by a factor of 10. The sides of the disc are understood to mean those sides of the body which are parallel to the plane spanned by the length and width, i.e., orthogonal to the axial direction of the electric machine. The substantially annular recess is provided in one of the sides of the coil disc. However, the coil disc can also have a substantially annular recess on each of the two sides.

The first and second coil discs can be attached to each other such that one of the two sides of the first coil disc rests against one of the two sides of the second coil disc, wherein it is not excluded that a sealing layer is arranged therebetween. For example, the first and second coil discs can be adhered to each other, wherein the adhesive can simultaneously seal, for example, the coolant channel from the environment.

In the following, the sides of the first and second coil discs that rest against the other coil disc are each called the inner side. Correspondingly, the sides of the first and second coil discs that face outwardly and do not rest against the other coil disc are referred to as the outer sides. It can therefore be understood that the substantially annular recess is provided on the inner side of the first coil disc and/or the inner side of the second coil disc.

If each of the first and second coil discs comprises a recess, the recesses of the first and second coil discs preferably have identical shapes and are preferably arranged such that they are exactly opposite and/or overlapping each other. However, it is also possible that the recess of the first coil disc has another shape than the recess of the second coil disc and/or that they are offset from each other in the assembled state of the coil module.

The substantially annular cooling channel can be understood to mean a space confined by the first and second coil discs, which space is confined on the one hand by the wall of the recess in the first or second coil disc and on the other hand by the inner side of the second coil disc. Preferably, the substantially annular cooling channel is confined by two recesses provided in the first coil disc and the second coil disc. However, the substantially annular cooling channel does not have to be completely confined. This means that the substantially annular cooling channel can, for example, comprise an inlet opening and/or an outlet opening by means of which coolant can enter and/or be discharged from the cooling channel.

This cooling channel offers the advantage that a coolant can be brought very close to the windings, so that the electric machine can be cooled very effectively. At the same time, this cooling structure does not require any additional components to conduct the coolant, so that this cooling structure saves space and weight. In addition, this cooling structure is also very robust and not prone to failure.

The coolant is preferably a water-based coolant, further preferably a water-glycol mixture. However, transformer oil can also be used as the coolant. The coil module described herein can, however, also be air-cooled.

Preferably, the first coil disc and/or the second coil disc comprises an inlet opening in the region of the recess for conducting coolant into the substantially annular cooling channel. Alternatively, or additionally, the first coil disc and/or the second coil disc comprises an outlet opening in the region of the recess for conducting coolant from the substantially annular cooling channel to the outside.

For example, the inlet opening and/or outlet opening can be provided in the radially outer side surface of the recess. Preferably, the inlet opening is provided in the side surface of the recess of the first coil disc and the outlet opening is provided in the side surface of the second recess or vice versa. An inlet channel can extend from the inlet opening in the first coil disc, and an outlet channel can extend from the outlet opening in the second coil disc. The inlet channel and the outlet channel can extend radially outwardly from the inlet opening and the outlet opening, respectively. The inlet channel can be formed as a recess in the first coil disc, and the outlet channel can be formed as a recess in the second coil disc. At the end of the inlet channel opposite the inlet opening, an inlet hole and/or an inlet through hole can be provided in the first and second coil discs to conduct the coolant into the inlet channel. At the end of the outlet channel opposite the outlet opening, an outlet hole and/or an outlet through hole can be provided in the first and second coil discs to conduct the coolant out of the outlet channel.

The inlet channel and/or the outlet channel preferably extend in an outer passive region of a winding which does not cover or only partially covers the outer passive regions of the directly adjacent windings. In this way, the inlet channel and/or the outlet channel is arranged in an area in which the thickness of the windings is as small as possible. This allows a space-saving arrangement.

Alternatively, the inlet opening and the outlet opening as well as the inlet channel and the outlet channel can be provided in only one of the two coil discs or in both coil discs.

If the electric machine comprises a plurality of coil modules connected to each other by a coil spacer, the coil spacer can also comprise inlet and outlet holes. In the assembled state, the inlet holes of the various coil modules and the coil spacers arranged therebetween overlap. Likewise, in the assembled state, the outlet holes of the various coil modules and the coil spacers arranged therebetween overlap. In other words, all inlet holes and all outlet holes can be respectively located on one line.

In this context, the inlet and outlet holes can be omitted, for example, in the coil disc or coil spacer located at one end of the electric machine when viewed in the axial direction. The coolant can be conducted into the individual coil modules through the inlet and outlet holes in the coil disc or coil spacer located at the other end of the electric machine. In this way, the different coil modules can be connected in parallel with respect to coolant flow.

In a top view of the coil disc, a first connecting line between the inlet opening and the center of the coil disc and a second connecting line between the outlet opening and the center of the coil disc can include an angle which is preferably less than 30°, more preferably less than 20°, still more preferably less than 10°. In particular, it is preferred to arrange the openings as close to each other as possible so that the corresponding angle is as small as possible. In this way, it can be ensured that the coolant flows as completely as possible around the center of the coil disc in order to ensure cooling of all windings.

Preferably, the first coil disc and/or the second coil disc comprises a bar and/or rib in the recess between the inlet opening and the outlet opening, the bar and/or rib being configured such that the substantially annular cooling channel comprises a dividing wall between the inlet opening and the outlet opening. It is to be understood that the bar and/or rib is arranged between the shortest connection of the inlet opening and the outlet opening in the recess in order to force the coolant to flow around almost the entire circumference of the coil disc.

The bar and/or rib can be understood to mean an interruption in the recess. In other words, it can be understood that the bar and/or rib extends from the radially inner edge of the recess to the radially outer edge of the recess. For example, the bar and/or rib can radially extend from the inner edge of the recess to the outer edge of the recess. Alternatively, the bar and/or rib can form an angle with respect to the radial direction. In this regard, the bar and/or rib can have an upper surface that lies above the bottom surface of the recess, preferably in the same plane as the remaining the inner surface of the coil disc. In this regard, the bar and/or rib is preferably as narrow as possible so that it continues to provide an effective blockage for the coolant.

Preferably, the first connecting line between the inlet opening and the center of the coil disc and the second connecting line between the outlet opening and the center of the coil disc also include an angle that is less than 30°. Due to the bar and/or rib between the inlet and outlet openings, the coolant cannot take the "short path" between the inlet and outlet openings and is forced to flow around the remaining, significantly larger circular arc portion of the cooling channel.

This bar and/or rib forms a barrier for the coolant in the cooling channel. Therefore, this bar and/or rib ensures that the coolant flows through all relevant areas of the first and second coil discs and thus cools all relevant areas of the first and second coil discs.

Preferably, the first and second coil discs each comprise a recess and a bar and/or rib. In the assembled state of the coil module, the bar and/or rib of the first coil disc and the bar and/or rib of the second coil disc are on top of each other, wherein it is not excluded that an adhesive layer and/or a sealing layer is arranged therebetween, wherein the adhesive can simultaneously constitute the seal.

Preferably, the first coil disc and the second coil disc each comprise: at least one coil carrier made of an electrically insulating material, and a plurality of individual windings made of an electrically conductive material and being circumferentially arranged on the at least one coil disc around a center of the at least one coil disc. In this regard, each of the windings comprises two active regions extending radially from the center and two passive regions extending tangentially at its radially outer and inner edges. Moreover, in a top view of the coil disc, the active regions of different windings do not overlap each other, but each passive region of one of the windings partially overlaps each of the corresponding passive regions of the two directly adjacent windings. Furthermore, in the active regions, the respective windings in cross-section have a greater thickness in the axial direction than in the passive regions.

Further technical effects, advantages and/or explanations with respect to these features are already disclosed elsewhere herein and also apply to the presently described features.

Preferably, the recesses/recess are/is arranged at least in the region of the radially extending active regions, preferably also in the region of the radially outer passive regions.

Since the passive regions of one of the windings partially overlap the corresponding passive regions of the directly adjacent windings, and the active regions of the different windings do not overlap each other, there can be space for the recess in the active regions of the first and/or second coil disc. Due to the fact that this space is used for cooling, providing the cooling channel by means of the recess/recesses does not lead to an increased consumption of space. At the same time, this type of winding offers the advantage, as already mentioned above, that a lot of conductive material can be installed in a small space.

However, the recesses/recess can also be provided at least partially in the passive regions, preferably in the radially outer passive regions. For example, the radially outer passive regions can have a greater width in the radial direction than the radially inner passive regions, so that it is possible to configure the radially outer passive regions with a smaller thickness in the axial direction. It is also possible that not the entire passive regions of the different windings overlap the passive regions of the directly adjacent windings. Hence, in this way, for example, there can also be space for the recess in the passive regions.

Preferably, the thickness in the axial direction of the active regions of the respective winding of the first and/or second coil disc decreases in the radial direction towards the outside. Furthermore, the width in the tangential direction of the active regions of the respective winding of the first and/or second coil disc increases in the radial direction towards the outside.

This structure is also referred to as "fanning out" of the active regions.

In this regard, the thickness in the axial direction does not have to decrease towards the outside along the entire length of the active regions, and the width in the tangential direction does not have to increase towards the outside along the entire length of the active regions. Preferably, however, the active regions are fanned out along at least 70%, preferably at least 90%, of their length.

Further technical effects, advantages and/or explanations with respect to these features are already disclosed elsewhere herein and also apply to the presently described features.

A further advantage of this fanning out consists in that the distance or gap between an active region of a winding and the active regions of the directly adjacent windings can be reduced.

An advantage resulting therefrom is that when the recess is located in the active regions of the winding or windings, the bottom surface of the recess is sealed by the coil disc itself. That is, there is no gap between the active regions of the winding or windings that would have to be additionally sealed. Thus, the coil disc is not only self-supporting, but also self-sealing.

In this way, for example, the film or foil described above can be dispensed with, so that the coil module as a whole has a reduced thickness in the axial direction. In this way, the magnet module in the electric machine can be brought closer to the winding or windings, which in turn increases the performance and/or efficiency of the electric machine.

Furthermore, this means that fewer process steps are required to manufacture the coil disc, coil modules and/or electric machine. Moreover, the tools for forming the coil disc can also be simplified, since no gaps have to be kept free between the active regions of the windings. All in all, the manufacturing costs for the electric machine can thus be reduced.

Preferably, the distance between an active region of a winding and the active regions of the directly adjacent windings is a few micrometers.

Preferably, a depth in the axial direction of the recess increases in the radial direction towards the outside.

The depth in the axial direction of the recess is understood to mean the depth of the recess measured in the axial direction, e.g., the difference between the lowest point (e.g., the bottom surface) of the recess and a plane defined by the inner side of the coil disc.

The fact that the depth in the axial direction of the recess increases in the radial direction towards the outside can be understood to mean that an inner radial substantially annular region of the recess has a smaller depth than a substantially annular region of the recess being located further outwardly with respect thereto.

The depth can increase continuously (i.e., steadily) or stepwise (i.e. discontinuously) from the inside to the outside. The depth can further increase linearly or non-linearly from the inside to the outside.

This geometry of the recess is also called "V-cooling" geometry.

Preferably, a ratio of the thickness of the respective winding in the passive regions to the thickness in the active regions is less than 1.

Technical effects, advantages and/or explanations with respect to these features are already disclosed elsewhere herein and also apply to the presently described features.

Preferably, the ratio of the thickness of the respective winding in the passive regions to the thickness in the active regions is greater than or equal to 0.3 and less than 1.

Technical effects, advantages and/or explanations with respect to these features are already disclosed elsewhere herein and also apply to the presently described features.

Preferably, the summed thickness in the axial direction of two directly adjacent windings in the region of the overlapping passive regions is greater than the thickness in the axial direction of each of the two directly adjacent windings in the active regions. For example, the summed thickness in the axial direction of two directly adjacent windings in the region of the overlapping inner passive regions and in the region of the overlapping outer passive regions is greater than the thickness in the axial direction of each of the two directly adjacent windings in the active regions. Alternatively, the summed thickness in the axial direction of two directly adjacent windings in the region of the overlapping inner passive regions can be greater than the thickness in the axial direction of each of the two directly adjacent windings in the active regions. Additionally, the summed thickness in the axial direction of the two directly adjacent windings in the region of the overlapping outer passive regions can be less than the thickness in the axial direction of each of the two directly adjacent windings in the active regions.

Due to the smooth transitions of the thicknesses, individual short areas of the windings can have other thicknesses that differ from the aforementioned thicknesses.

This can apply to all or substantially all of the directly adjacent windings. That is, one active region or a few active regions can be located in the region of the bar and/or rib described herein and thus have a greater thickness than the other active regions.

The summed thickness in the axial direction of two directly adjacent windings in the region of the overlapping passive regions is understood to mean the sum of the respective thickness in the axial direction of the respective passive regions of the respective windings, wherein the thickness of the respective passive regions is measured in a region in which the passive regions of the directly adjacent windings overlap.

This can apply to the radially inner and radially outer passive regions. Alternatively, only in the radially inner passive regions, the summed thickness in the axial direction of the two directly adjacent windings can be greater than the thickness in the axial direction of each of the two directly adjacent windings in the active regions.

In this way, the active regions and, if applicable, the outer passive regions in the axial direction preferably occupy less space all in all than the passive regions. As a result, the coil discs in the region of the active regions and, if applicable, the outer passive regions have space for the recess.

Preferably, a ratio of the summed thickness in the axial direction of two directly adjacent windings in the region of the overlapping passive regions to the maximum thickness in the axial direction of each of the two directly adjacent windings in the active regions is greater than 1.

This can apply to all directly adjacent windings.

Preferably, the shape of the cross-sectional area of the respective winding changes at a transition from an active region to a passive region.

Technical effects, advantages and/or explanations with respect to these features are already disclosed elsewhere herein and also apply to the presently described features.

Preferably, all active regions of different windings are arranged in a single plane in a side view.

Technical effects, advantages and/or explanations with respect to these features are already disclosed elsewhere herein and also apply to the presently described features.

Preferably, the windings are formed from a fine strand of a plurality of wires being electrically insulated from each other and having a wire diameter of less than or equal to 0.1 mm.

Technical effects, advantages and/or explanations with respect to these features are already disclosed elsewhere herein and also apply to the presently described features.

Preferably, a number of the windings corresponds to an integer multiple of three so that the windings enable a three-phase operation.

Technical effects, advantages and/or explanations with respect to these features are already disclosed elsewhere herein and also apply to the presently described features.

Preferably, an inner passive region and an outer passive region of one of the windings differ in thickness in the axial direction.

Technical effects, advantages and/or explanations with respect to these features are already disclosed elsewhere herein and also apply to the presently described features.

Preferably, the thickness of the outer passive region of one of the windings is selected such that a ratio of the thickness of this region to the thickness of the active regions is less than or equal to 0.5.

Technical effects, advantages and/or explanations with respect to these features are already disclosed elsewhere herein and also apply to the presently described features.

The invention further relates to an electric machine comprising a bearing arrangement and a shaft guided in the bearing arrangement, wherein at least one magnet module comprising a plurality of permanent magnets and at least one coil module disclosed within the scope of the present application are concentrically arranged along the shaft.

Preferably, the electric machine comprises at least one coil module, preferably at least one coil module and at most six coil modules, particularly preferably at least one coil module and at most three coil modules. In this context, the electric machine preferably comprises one more magnet module than coil modules.

Technical effects, advantages and/or explanations with respect to these features are already disclosed elsewhere herein and also apply to the presently described features.

The invention further relates to a vehicle or a machine tool comprising an electric machine as disclosed within the scope of the present application.

Technical effects, advantages and/or explanations with respect to these features are already disclosed elsewhere herein and also apply to the presently described features.

Further embodiments of the invention are disclosed in the following numbered aspects:

1. A coil module (18) for an electric machine, comprising
   at least one coil disc (6) comprising
      at least one a coil carrier (15) made of an electrically insulating material and
      a plurality of individual windings (13) made of an electrically conductive material and being circumferentially arranged on the at least one coil disc (6) around a center (14) of the at least one coil disc (6), wherein
      each of the windings (13) comprises two active regions (16) extending radially from the center (14) and two passive regions (17a, 17b) extending tangentially at its radially outer and inner edges, and,
      in a top view of the coil disc (6), the active regions (16) of different windings (13) do not overlap each other, but each passive region (17a, 17b) of one of the windings (13) partially overlaps the corresponding passive regions (17a, 17b) of the two directly adjacent windings (13), characterized in that,
in the active regions (16), the respective winding (13) in cross-section has a greater thickness in the axial direction than in the passive regions (17a, 17b).

2. The coil module (18) according to aspect 1, characterized in that a ratio of the thickness of the respective winding (13) in the passive regions (17a, 17b) to the thickness in the active regions (16) is less than 1.

3. The coil module (18) according to aspect 1 or aspect 2, characterized in that the ratio of the thickness of the respective winding (13) in the passive regions (17a, 17b) to the thickness in the active regions (16) is greater than or equal to 0.3 and less than 1.

4. The coil module (18) according to any one of the preceding aspects, characterized in that the shape of the cross-sectional area of the respective winding (13) changes at a transition from an active region (16) to a passive region (17a, 17b).

5. The coil module (18) according to any one of the preceding aspects, characterized in that all active regions (16) of different windings (13) are arranged in a single plane in a side view.

6. The coil module according to any one of the preceding aspects, characterized in that the thickness in the axial direction of the active regions (16) of the respective winding (13) decreases in the radial direction towards the outside; and
the width in a tangential direction of the active regions (16) of the respective winding (13) increases in the radial direction towards the outside.

7. The coil module (18) according to any one of the preceding aspects, characterized in that the windings are formed from a fine strand of a plurality of wires being electrically insulated from each other and having a wire diameter of less than or equal to 0.1 mm.

8. The coil module (18) according to any one of the preceding aspects, characterized in that a number of the windings (13) corresponds to an integer multiple of three so that the windings (13) enable a three-phase operation.

9. The coil module (18) according to any one of the preceding aspects, characterized in that an inner passive region (17a) and an outer passive region (17b) of one of the windings (13) differ in thickness in the axial direction.

10. The coil module (18) according to aspect 9, characterized in that the thickness of the outer passive region (17) of one of the windings (13) is selected such that a ratio of the thickness of this region to the thickness of the active regions (16) is less than or equal to 0.5.

11. An electric machine comprising a bearing arrangement (1, 3) and a shaft (2) guided in the bearing arrangement (1, 3), wherein at least one magnet module (4) comprising a plurality of permanent magnets (5) and at least one coil module (18) according to any one of the preceding aspects are concentrically arranged along the shaft (2).

12. The electric machine according to aspect 11, characterized in that a film or foil made of an electrically insulating material is adhered to the at least one coil module (18) at least on its side facing the magnet module (4).

13. The electric machine according to aspect 11 or aspect 12, characterized in that the at least one coil module (18) comprises at least two coil discs (6) connected to each other and a cooling channel formed by a cavity between the two coil discs.

14. A vehicle or machine tool comprising an electric machine according to any one of aspects 11 to 13.

15. A coil module (18) for an electric machine, in particular according to any one of the preceding aspects, comprising:
a first coil disc (6) having at least one winding (13) of an electrically conductive material;
a second coil disc (6) having at least one winding (13) of an electrically conductive material;
wherein the first coil disc (6) and/or the second coil disc (6) comprise/comprises a substantially annular recess (22);
wherein the first coil disc (6) and the second coil disc (6) are attached to each other such that a substantially annular cooling channel (23) for a coolant is formed between the first coil disc (6) and the second coil disc (6) by the substantially annular recesses/recess (22).

16. The coil module (18) according to aspect 15, wherein the first coil disc (6) and/or the second coil disc (6) comprises an inlet opening (43) in the region of the recess (22) for conducting coolant into the substantially annular cooling channel (23); and/or
wherein the first coil disc (6) and/or the second coil disc (6) comprises an outlet opening (45) in the region of the recess (22) for conducting coolant from the substantially annular cooling channel (23) to the outside.

17. The coil module (18) according to aspect 16, wherein the first coil disc (6) and/or the second coil disc (6) comprises a bar and/or rib (38a, 38b) in the recess (22) between the inlet opening (43) and the outlet opening (45), the bar and/or rib (38a, 38b) being configured such that the substantially annular cooling channel (23) comprises a dividing wall between the inlet opening (43) and the outlet opening (45).

18. The coil module (18) according to any one of aspects 15 to 17, wherein the first coil disc (6) and the second coil disc (6) each comprise:
at least one coil carrier (15) made of an electrically insulating material, and
a plurality of individual windings (13) made of an electrically conductive material and being circumferentially arranged on the at least one coil disc (6) around a center (14) of the at least one coil disc (6), wherein
each of the windings (13) comprises two active regions (16) extending radially from the center (14) and two passive regions (17b) extending tangentially at its radially outer and inner edges, and
in a top view of the coil disc (6), the active regions (16) of different windings (13) do not overlap each other, but each passive region (17a, 17b) of one of the windings (13) partially overlaps each of the corresponding passive regions (17a, 17b) of the two directly adjacent windings (13), characterized in that
in the active regions (16), the respective winding (13) in cross-section has a greater thickness in the axial direction than in the passive regions (17a, 17b).

19. The coil module (18) according to aspect 18, wherein the recesses/recess (22) are/is arranged at least in the region of the radially extending active regions (16) and preferably also in the region of the radially outer passive regions (17b).

20. The coil module (18) according to aspect 19, wherein the thickness in the axial direction of the active regions (16) of the respective winding (13) of the first and/or second coil disc decreases in the radial direction towards the outside; and
    wherein the width in the tangential direction of the active regions (16) of the respective winding (13) of the first and/or second coil disc increases in the radial direction towards the outside.
21. The coil module (18) according to aspect 20, wherein a depth (34, 34a, 34b) in the axial direction of the recess (22) increases in the region of the active regions (16) in the radial direction towards the outside.
22. The coil module (18) according to any one of aspects 18 to 21, wherein a ratio of the thickness of the respective winding (13) in the passive regions (17a, 17b) to the thickness in the active regions (16) is less than 1.
23. The coil module (18) according to any one of aspects 18 to 22, wherein the ratio of the thickness of the respective winding (13) in the passive regions (17a, 17b) to the thickness in the active regions (16) is greater than or equal to 0.3 and less than 1.
24. The coil module (18) according to any one of aspects 18 to 23, wherein the shape of the cross-sectional area of the respective winding (13) changes at a transition from an active region (16) to a passive region (17a, 17b).
25. The coil module (18) according to any one of aspects 18 to 24, characterized in that all active regions (16) of different windings (13) are arranged in a single plane in a side view.
26. The coil module (18) according to any one of aspects 18 to 25, characterized in that the windings are formed from a fine strand of a plurality of wires being electrically insulated from each other and having a wire diameter of less than or equal to 0.1 mm.
27. The coil module (18) according to any one of aspects 18 to 26, characterized in that a number of the windings (13) corresponds to an integer multiple of three so that the windings (13) enable a three-phase operation.
28. The coil module (18) according to any one of aspects 18 to 27, characterized in that an inner passive region (17a) and an outer passive region (17b) of one of the windings (13) differ in thickness in the axial direction.
29. The coil module (18) according to aspect 28, characterized in that the thickness of the outer passive region (17b) of one of the windings (13) is selected such that a ratio of the thickness of this region to the thickness of the active regions (16) is less than or equal to 0.5.
30. An electric machine comprising a bearing arrangement (1, 3) and a shaft (2) guided in the bearing arrangement (1, 3), wherein at least one magnet module (4) comprising a plurality of permanent magnets (5) and at least one coil module (18) according to any one of the aspects 15 to 29 are concentrically arranged along the shaft (2).
31. A vehicle (50) or a machine tool (54) comprising an electric machine according to aspect 30.

BRIEF DESCRIPTION OF THE FIGURES

Exemplary embodiments of the invention are illustrated in the drawings and are explained in the following with reference to the Figures discussed in the following, in which
FIGS. 9A, 9B show a top view and a sectional view of a winding;
FIG. 10 shows a sectional view through a coil module.

DETAILED DESCRIPTION OF THE EMBODIMENTS

Figure 1:
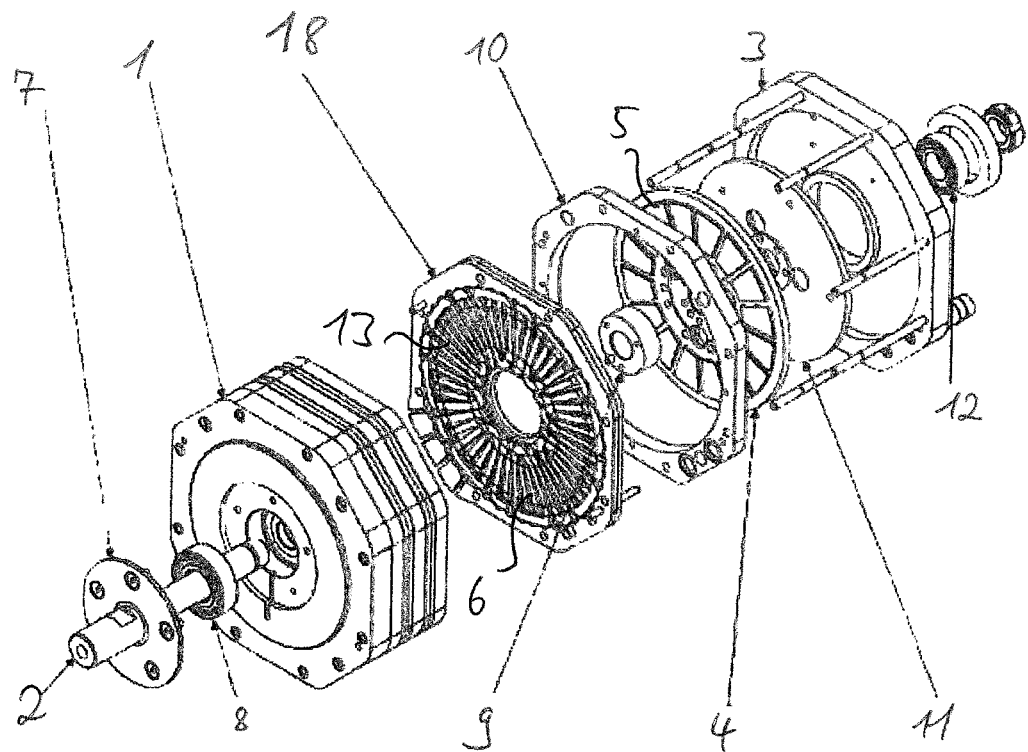
FIG. 1 shows an exploded view of an electric motor.

FIG. 1 shows an exploded view of an electric motor. A first bearing shield 1, together with a second bearing shield 3, forms a bearing arrangement for a motor shaft 2. The motor shaft 2 is centrally guided in the bearing shields 1 and 3 and is provided with a bearing cap 7 and a fixed bearing 8 in the region of the first bearing shield 1 and with a movable bearing 12 in the region of the second bearing shield 3. In the shown exemplary embodiment, the bearing shields 1 and 3, the bearing cap 7 and a coil spacer 10 and a magnet spacer 9 are made of polyamide, the motor shaft 2 is made of stainless steel, and the fixed bearing 8 and the movable bearing 12 are deep groove ball bearings made of steel.

A coil module 18 comprising two coil discs 6 axially arranged one behind the other and a magnetic disc or magnet module 4 are visibly arranged between the first bearing shield 1 and the second bearing shield 3 and are kept at a predetermined spatial distance from each other by the coil spacer 10 and the magnet spacer 9. The coil module 18 is disc-shaped, i.e., its length and width are significantly greater than its thickness (which is measured in the axial direction in FIG. 1). In this context, the term "significantly greater" is intended to mean that its thickness is maximally 10 percent of its length or its width. Typically, the length and the width are equal. In the illustrated exemplary embodiment, the coil module 18 serves as a stator which, stacked on the motor shaft 2, is adjacent to two magnetic discs or magnet modules 4 serving as rotors. The stator is centrally arranged between the two magnetic discs 4. In addition, in the exemplary embodiment shown in FIG. 1, a back iron 11 is provided between the magnetic disc 4 and the second bearing shield 3, but this back iron 11 can also be omitted or alternatively configured in further exemplary embodiments.

The magnetic discs 4 consist of a non-magnetizable, preferably electrically non-conductive material such as aluminum and are attached to the motor shaft 2 mounted in the bearings 8 and 12 of the bearing shields 1 and 3. The magnet spacer 9, which provides an air gap between the magnetic discs 4 in which the coil module 18 is arranged, is also mounted on the motor shaft 2. Permanent magnets 5 are radially circumferentially arranged on the magnetic disc 4 in alternating orientation, i.e. always alternating with the north pole and the south pole pointing in the direction of the stator, i.e., in the axial direction. A number of the permanent magnets 5 is always even. Preferably, the number of permanent magnets 5 just corresponds to twice a number of windings per phase.

In the exemplary embodiment shown in FIG. 1, an individual coil module 18 can be made from two coil discs 6, but it can also be provided to connect three or more of these coil discs 6 to each other and thus obtain the coil module 18. During operation, a cooling medium can be conducted in a cavity forming between the individual coil discs 6. The simplest but at the same time efficiently operable structure of the motor is one individual coil module 18 comprising a single coil disc 6 and two magnetic discs 4, but it can also be provided to provide correspondingly more coil modules 18 and magnetic discs 4, wherein a number of the magnetic discs 4 is preferably greater by one than a number of the coil modules 18. Advantages of a corresponding modular design result from the variable number of installed coil modules 18 and magnetic discs 4, especially in the case of a corresponding shaft and bearing design. In addition to a combination of the two modules of coil module 18 and magnetic disc 4, the variation of the individual modules leads to further flexibility in the motor design. The coil module 18 and the magnetic disc 4 can be adapted independently of each other, e.g., only an adaptation of the permanent magnets 5 can be required, while the remaining structure remains unchanged.

Figure 2:
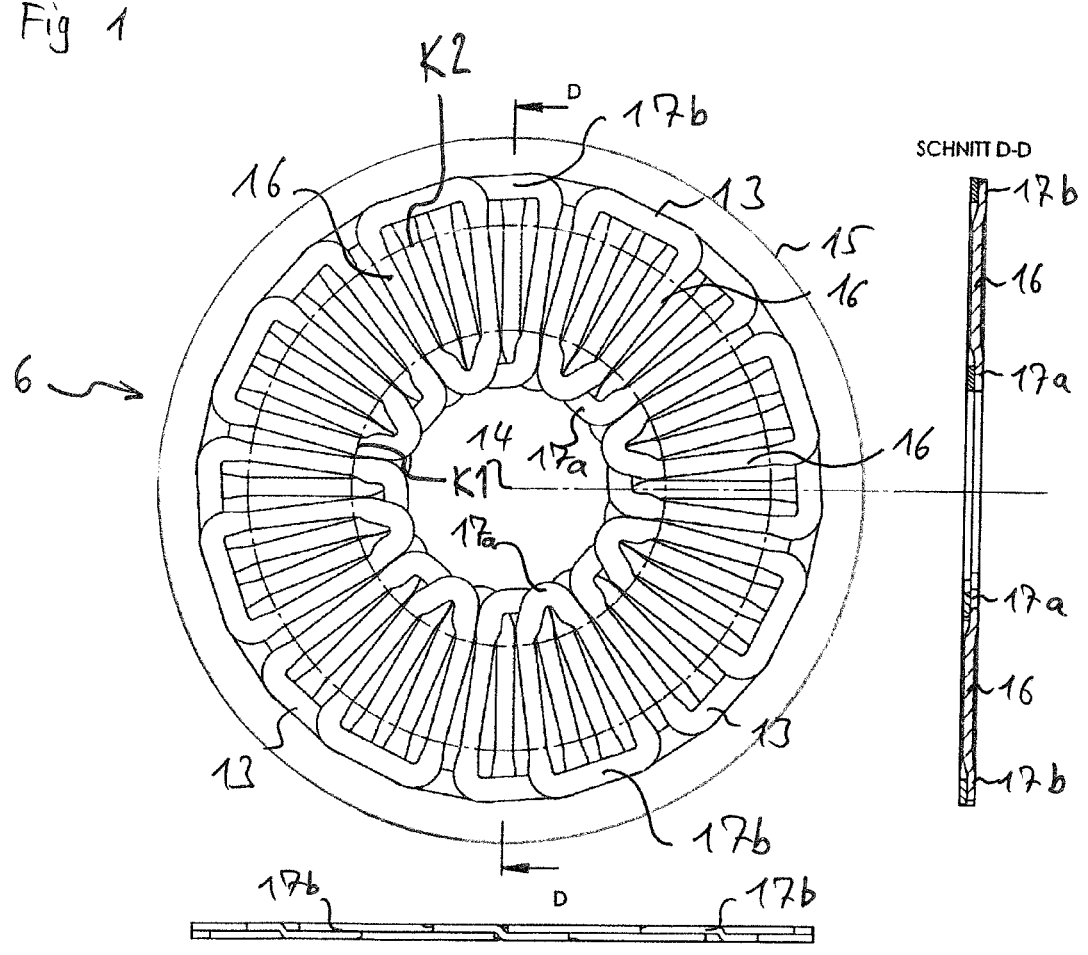
FIG. 2 shows a top view of a coil disc.

In FIG. 2, a coil carrier 15 forming the coil disc 6 and comprising windings 13 arranged thereon is shown in a top view, i.e., along a normal direction which is perpendicular both to the length and to the width of the coil module 18. Recurring features are indicated by identical reference signs in this Figure as well as in the following Figures. In a top view, the coil carrier 15 is round, i.e., in terms of size the length just corresponds to the width, and is made of an electrically insulating material. A plurality of individual windings 13 are radially circumferentially arranged on the coil carrier 15 around a center 14 of the coil carrier 15, wherein each of the windings 13 is electrically insulated from directly adjacent windings 13. At the center 14, the axis of rotation of the electric machine intersects the coil carrier 15. In the exemplary embodiment depicted in FIG. 2, these windings 13 are wound in three phases. Each winding consists of a plurality of turns of a wire strand. This entails that every third winding 13 in its arrangement in the compound has the same configuration. These windings 13 are also positioned identically in terms of their depth orientation and depth arrangement: a first phase is thus formed by the windings 13 visible as the uppermost layer in FIG. 1, a second phase is formed by the windings 13 half covered as seen from above, and a third phase is formed by the windings 13 fully covered as seen from above.

Each of the windings 13 comprises two radially extending active regions 16 starting from the center 14 of the coil disc 6 and contributing to the torque of the motor, and two approximately tangentially extending passive regions 17a and 17b at its radially outer edge and inner edge, i.e., a radially inner passive region 17a and a radially outer passive region 17b. The inner passive regions 17a, which are thus arranged closer to the center 14 than the outer passive regions 17b, are shorter in length than the outer passive regions 17b. The active regions 16 of different windings 13 do not overlap each other in a top view, i.e., in a view along the motor shaft 2, each of the inner and outer passive regions 17a and 17b of one of the windings 13 partially overlaps the corresponding passive regions 17a and 17b of the two directly adjacent windings 13.

In this context, the circles K1 and K2 represent the radially inner and radially outer boundaries of the active regions 16. That is, the active regions 16 extend from the inner circle K1 to the outer circle K2. The regions of the windings which are located outside these circles K1 and K2 are to be assigned to the passive regions 17a and 17b.

In the exemplary embodiment shown in FIG. 2, each of the three phases is made up of individual teeth, i.e., individual windings 13; wherein the individual windings 13 are wound so as to have a plurality of turns, but only a single turn can also be provided. A special feature is that the different phases in the active regions 16 structured in a spoke-like manner lie next to each other in a single plane. In FIG. 2, these active regions 16 are indicated by the two circular lines above the windings 13. Therefore, the active regions 16 are identical in shape and dimensions, while the passive regions 17a and 17b are differently structured both as regards their shape and as regards their dimensions.

The passive regions 17a and 17b comprise overlaps of every two adjacent teeth, which entails that the individual phases must perform a plane change. Without a change in cross-section, the thickness of the coil disc 6 in the region of the passive regions 17a and 17b doubles in the axial direction in the case of direct overlapping. An increase in an axial distance of the permanent magnets 5 resulting therefrom can be influenced by a change in cross-section, i.e., a change in the thickness-to-width ratio or height-to-width ratio, of the windings 13. A ratio of the thickness of the respective winding 13 in the active regions 16 to the thickness in the passive regions 17a and 17b is just 2 in the illustrated exemplary embodiment. In a simplified manner, a thickness or height of the active regions 16 (which are all identical in terms of their thickness in the shown exemplary embodiment) in the axial direction which has been standardized to 1 can be assumed in this context, whereas the passive regions 17a and 17b (which are also all identical in terms of their thickness in the shown exemplary embodiment) have a smaller thickness of 0.75 relative to this standardized thickness, but in a side view these thicknesses of the passive regions 17a and 17b add up to only 1.5 due to their arrangement in alignment one behind the other. Such an arrangement is shown, for example, in the sectional view in FIG. 2 on the right-hand side. While, considered individually, the passive regions 17a and 17b each have a smaller thickness or height than the active regions 16, the passive regions 17 appear to be thicker in the superimposed arrangement of the windings 13 due to the overlaps and additional available space is obtained in the central part in which the permanent magnets 5 can be guided closer to the active regions 16. The lower part of FIG. 2 schematically illustrates a course of the outer passive regions 17b. This schematic illustration makes it clear that every third winding 13 performs a plane change in its passive region 17b. In the shown exemplary embodiment, a number of the windings 13 corresponds to an integer multiple of three, so that the windings 13 enable a three-phase operation. Thus, a total of three strands of different phases are formed from the windings 13, wherein all active regions 16 of the windings 13 are in a single plane in a side view, while the passive regions 17a and 17b are distributed over two planes. Two phases are in one plane and a third phase performs an additional plane change.

Two phases can be stacked or placed next to each other, for example, in the radial direction instead of in the axial direction by means of a corresponding change in cross-section, resulting in an enlargement of the coil disc 6 in the radial direction. When the height or thickness of the passive regions 17a and 17b is doubled in the radial direction, doubling of the two phases in the axial direction is compensated for and one plane is achieved for the entire coil disc 6. Hence, this leads to a three-phase wound coil module 18 without iron core with an adaptable cross-sectional change of the windings 13 and thus to an adaptable axial height of the coil module 18 for use in axial flux electric motors without iron core.

Thus, in the exemplary embodiment shown in FIG. 2, eight windings 13 arranged in a circle and electrically connected in series form a coil. Corresponding to the three phases of the electric current, three of these coils are combined with the coil carrier 15 in the coil disc 6 and the coil module 18.

In further exemplary embodiments, it is also possible to adhere two or more coil discs 6 to each other or otherwise bond or connect them to each other in a substance-to-substance or non-positive or friction-locking manner in order to thus obtain the coil module 18. A size of the cavity between the active regions 16 can be adjusted by a change in the cross-section of the coil structure formed by the windings 13.

Figure 3:
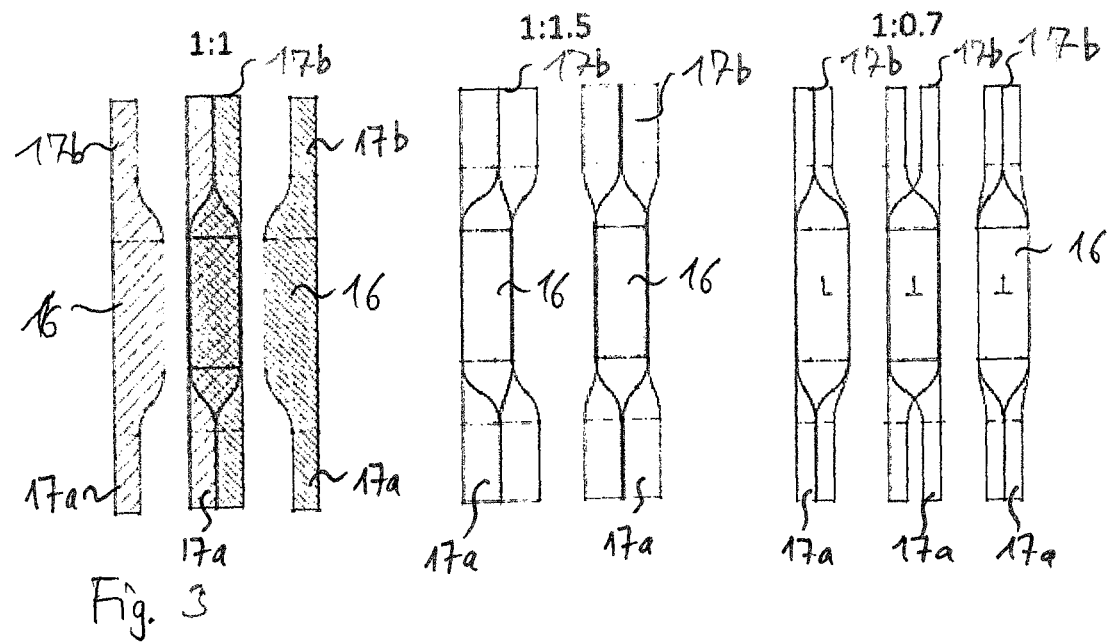
FIG. 3 shows a side view of a coil module.

FIG. 3 shows a schematic side view of corresponding cross-sectional changes on the coil disc 6. On the left-hand side, below the indication of the ratio of 1:1, FIG. 3 schematically illustrates a winding 13, in said winding 13 the passive regions 17a and 17b being only half as thick as the active regions 16. In a single coil disc 6, only the passive regions 17a and 17b always overlap partially (and never completely), but never the active regions 16. The thicker active regions 16 are arranged one behind the other in the same plane in the left view of FIG. 3, while the passive regions 17a and 17b, due to the change in cross-section, are only half as thick and, due to the different planes, exhibit an overall ratio between active regions 16 and passive regions 17a and 17b of 1:1, i.e. the sum of the thicknesses of the passive regions 17a and 17b is just equal to the thickness of the active regions 16 in cross-section.

In the middle drawing in FIG. 3 with the ratio 1:1.5, the coil disc 6 is again shown in cross-section. Due to the overlap, the passive regions 17 are now just 1.5 times thicker in total in the depicted cross-sectional view than the active regions 16, which require less available space due to their arrangement one behind the other in a side view. The two exemplary embodiments shown below the indication of 1:1.5 show different plane changes, resulting in one cavity on the right-hand side of the active region 16 in the first exemplary embodiment (left) and two cavities on either side of the active region 16 in the second exemplary embodiment (right). The magnets of the magnet arrangement can be inserted into cavities formed in this way and thus the axial distance or gap between the active regions 16 and the permanent magnets 5 can be reduced (even though this gap cannot disappear completely). The available space is thus utilized more efficiently. Alternatively, the cavities that form can also be used for cooling.

Finally, a ratio of 1:0.7 is shown on the right-hand side of FIG. 3. The three depicted exemplary embodiments illustrate a formation of cavities by means of appropriate cross-sectional and plane changes in the passive regions 17a and 17b. These cavities can also be used for cooling. In the described exemplary embodiments, flexible wire strands made of copper or aluminum and having a diameter of less than 2 mm, namely 1.2 mm in the shown exemplary embodiment, are preferably used for the windings 13, wherein said wire strands consist of a plurality of individual wires electrically insulated from each other and having a diameter of less than 0.2 mm, but typically 0.05 mm in the shown exemplary embodiment.

A cavity formed between the active regions 16, configured as bars and/or ribs, of the coil discs 6 forming the coil module 18 can be used for a cooling medium to flow through. In this case, for the purpose of hydraulic sealing, a fluid-tight film or foil made of an electrically non-conductive material is adhered to the coil discs 6 on a side facing the magnetic disc 4 so that the coil module 18 formed from a plurality of coil discs 6 is sealed towards the outside. The cavities can be rectangular, triangular or trapezoidal or have complex shapes.

Figure 4:
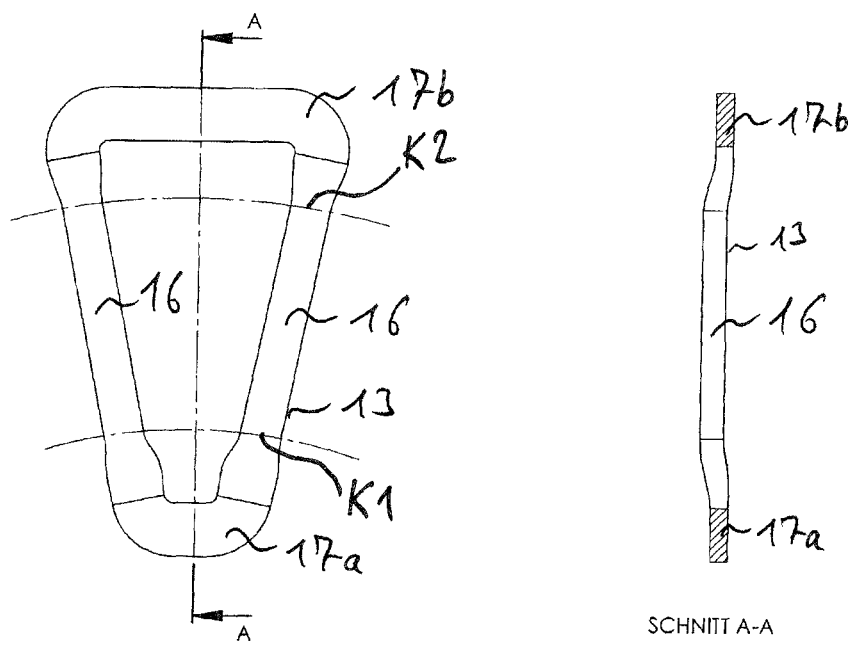
FIG. 4 shows a top view and sectional view of a winding.

In FIG. 4, the left-hand drawing shows a top view of one of the windings 13 as shown in FIG. 2. The sectional view through the winding 13 as shown on the right-hand side of FIG. 4 reveals that in the active regions 16 the thickness is greater than in the passive regions 17a and 17b.

As in FIG. 2, the circles K1 and K2 represent the extent of the active regions 16.

Figure 5:
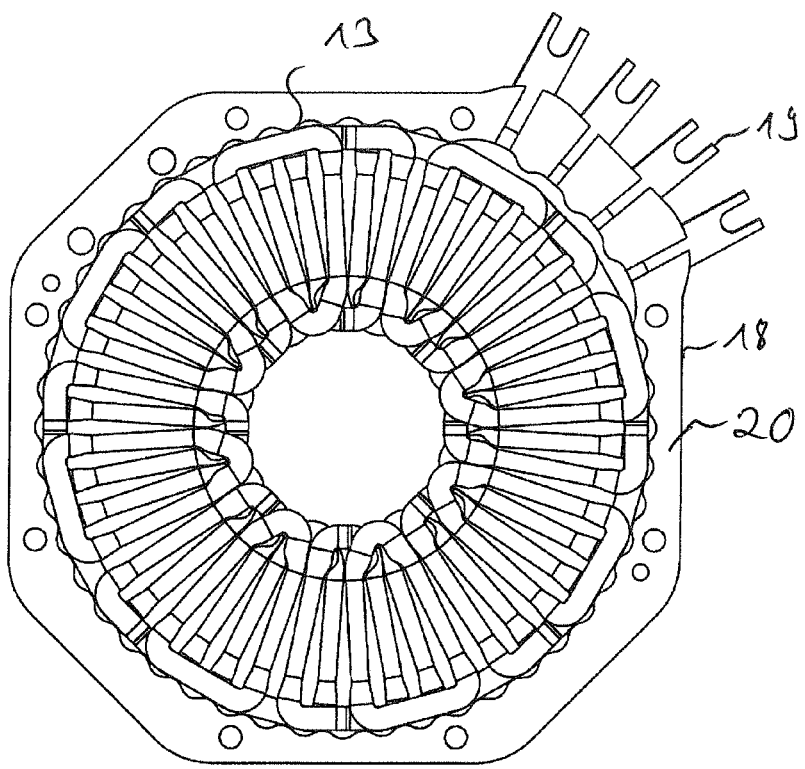
FIG. 5 shows a top view of the coil module.

In a top view corresponding to FIG. 2, FIG. 5 shows a coil module 18 in which two coil discs 6 are arranged one behind the other in the axial direction and embedded in a coil carrier ring 20 supplementing the coil carrier 15, wherein from the windings 13 electrical contacts 19 are led out of the coil carrier ring 20. In this exemplary embodiment, the coil carrier ring 20 is made of a fiberglass epoxy resin fabric.

Figure 6:
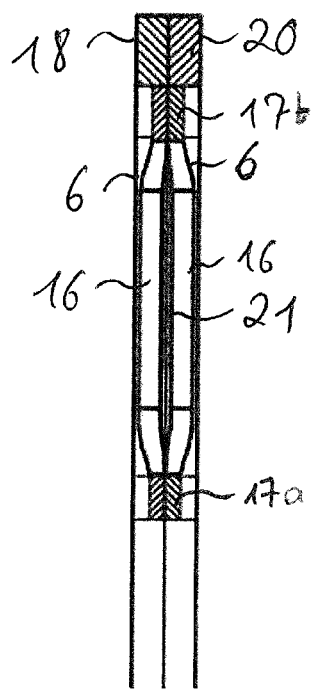
FIG. 6 shows a sectional view of the coil module.

FIG. 6 shows the coil module 18 in a sectional view, wherein the two coil discs 6 combined with each other are arranged such that a cavity 21 is formed between the active regions 16 of both coil discs 6. Since the coil discs are sealed in a fluid-tight manner by means of a film or foil, a cooling medium can be introduced into this cavity 21.

Figure 7:
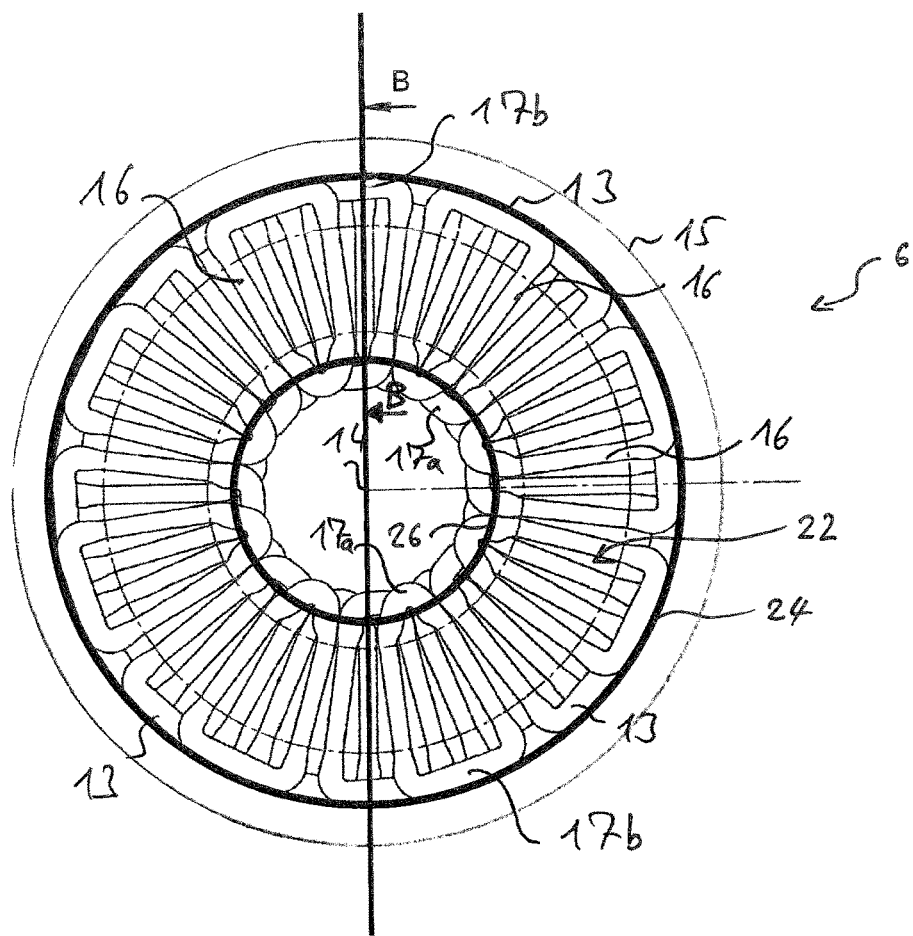
FIG. 7 shows a top view of the coil disc.

FIG. 7 shows an inner side of a coil disc 6 of a coil module for an electric machine, by means of which the cooling geometry is explained in more detail. The coil disc 5 comprises a coil carrier 15 made of an electrically insulating material as well as at least one winding 13 made of an electrically conductive material and being circumferentially arranged around a center 14 of the at least one coil disc 6 on or in the coil disc 6.

Advantageously, the windings 13 are the windings comprising active regions 16 and passive regions 17a, 17b as described in more detail in the context of the present application, wherein the active regions 16 of different windings 13 do not overlap each other, but each passive region 17a, 17b of one of the windings 13 partially overlaps the corresponding passive regions 17a, 17b of the two directly adjacent windings 13, and in the active regions 16 the respective winding 13 has a greater thickness in cross-section in the axial direction than in the passive regions 17. However, the winding 13 can also be a different type of winding. For example, the at least one winding 13 can also be in the form of at least one winding arranged in a meandering manner around the center 14.

The coil disc 6 further comprises a substantially annular recess 22. The recess 22 is located on the inner side of the coil disc 6, i.e., the side facing the other coil disc in the coil module, such that the recess 22 is enclosed within the two coil discs and thus forms the cooling channel. The recess 22 comprises an outer edge 24 and an inner edge 26, starting from which the recess 22 is recessed with respect to the remaining surface of the coil disc 6. That is, apart from the recess 22, the inner side of the coil disc 6 lies substantially in one plane so that the edges 24 and 26 each represent the transition from the planar inner side of the coil disc 6 to the recess 22. Although the recess 22 is drawn in an exact annular shape in this embodiment, it does not have to be an exact annular shape according to the invention. The recess 22 extends substantially around the center 14 and is not located in the center 14 itself. However, the recess 22 can include a bar and/or rib or bars and/or ribs interrupting the recess 22, as explained in more detail elsewhere in the present application. Furthermore, the inner edge 26 and/or outer edge 24 of the recess 22 does not have to be exactly circular and can have, for example, a polygonal or irregular shape.

The inner edge 26 of the recess 22 is located at the region of the transition from the active regions 16 to the inner passive regions 17a of the windings 13. The outer edge 24 of the recess 22 is located at the radially outermost region of the outer passive regions 17b of the windings 13. This arrangement of the recess 22 can be advantageous since the radially inner passive regions 17a are thicker than the radially outer passive regions 17b due to the limited space, and the inner passive regions 17a of directly adjacent windings 13 each overlap in contrast to the active regions 16 so that the summed thickness in the axial direction of the radially inner passive regions 17a is greater than the thickness of the active regions 16. Therefore, space for the recess 22 is available in the region of the active regions 16 and, as the case may be, in the region of the outer passive regions 17b. Alternatively, the outer edge 24 of the recess 22 can also be located at the transition between active regions 16 and radially outer passive regions 17b.

It should be mentioned that if the electric machine has a construction as optimal as possible, it can be advantageous to arrange the recess 22 as described. However, the recess 22 can also be arranged differently, e.g., if compromises are made for space requirements, performance and/or efficiency.

The recess 22 can have different cross-sections, as exemplarily depicted in FIGS. 8A to 8D. FIGS. 8A to 8D each show a sectional view of the plane B-B shown in FIG. 7.

Figure 8A:
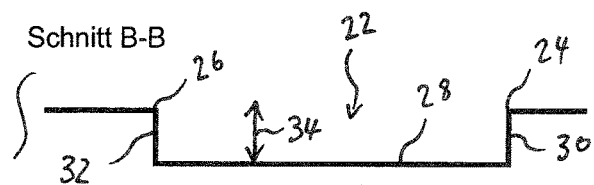
FIGS. 8A to 8D show sectional views through a coil disc.

FIG. 8A illustrates a recess 22 having a rectangular cross-section. The recess 22 has an outer side surface 30, a bottom surface 28 and an inner side surface 32, the inner and outer side surfaces 30, 32 each being orthogonal to the bottom surface 28 and the bottom surface 28 being parallel to the inner side of the coil disc. Thus, the recess 22 has a constant depth 34 along the radial direction from the inside to the outside, i.e., from the inner edge 26 to the outer edge 24.

Figure 8B:
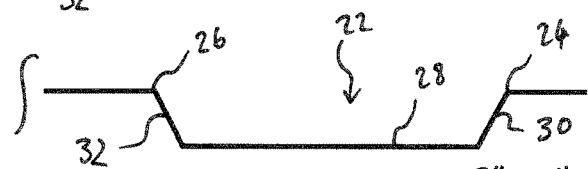

FIG. 8B shows a recess 22 having a trapezoidal cross-section. In contrast to the cross-section shown in FIG. 8A, the side walls 30 and 32 are not orthogonal to the bottom surface 28 but are inclined towards the bottom surface 28 so that the depth of the recess 22 steadily increases towards the bottom surface 28 in the region of the side walls 30, 32. In the region of the bottom surface 28, the height can again be constant as described with respect to FIG. 8A.

Figure 8C:
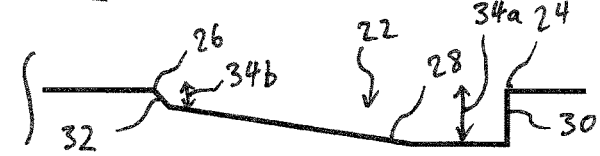

FIG. 8C shows a recess 22 with a depth 34a, 34b increasing in the radial direction from the inside to the outside, i.e., from the inner edge 26 to the outer edge 24. That is, the bottom surface 28 is at least partially not parallel to the inner side of the coil disc. Thus, a portion of the bottom surface 28, for example a radially outer portion of the bottom surface 28, can be parallel to the inner side of the coil disc, whereas another portion of the bottom surface 28, for example a radially inner portion of the bottom surface 28, can be inclined such that the depth 34a, 34b of the recess 22 increases from radially inside to radially outside. Furthermore, each of the inner side surface 32 and the outer side surface 30 can be orthogonal or angled to the inner side of the coil disc. In the present example, the outer side surface 30 is orthogonal to the inner side of the coil disc, whereas the inner side surface 32 is angled thereto.

The recess 22 can be arranged in the coil disc such that the portion of the bottom surface 28 described above, which is parallel to the inner side of the coil disc, lies in the region of the radially outer passive regions 17b of the windings including their radially extending regions in which a change in cross-section occurs. The inclined portion of the bottom surface 28 lies in the region of the fanned-out active regions of the windings. The inner side surface 32 lies in the region of the inner passive regions of the windings in which a change in cross-section occurs.

This cross-section of the recess 22 shown in FIG. 8C can in particular be provided when the active regions of the windings are "fanned out" as explained herein. This shape of recess is also called "V-cooling" geometry.

Figure 8D:
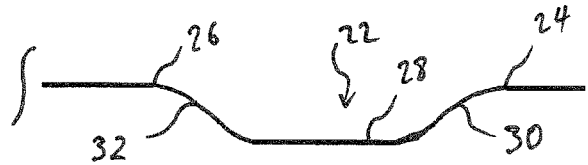

FIG. 8D shows a cross-section of a recess 22 in which the transitions from the inner side of the coil disc to the inner side surface 32, to the bottom surface 28 and to the outer side surface 30 are continuous and/or steady. Such continuous and/or steady transitions are also possible for the cross-sections shown in FIGS. 8A to 8C.

The recess 22 can also have a cross-sectional shape resulting from a combination of the cross-sections shown in FIGS. 8A to 8D.

FIGS. 9A and 9B show a top view of a winding 13, by means of which the "fanning out" disclosed in the context of the present application is explained in more detail. The winding comprises two radially extending active regions 16 as well as an inner tangentially extending passive region 17a and an outer tangentially extending passive region 17b respectively connecting the two active regions 16. As disclosed herein, the thickness in the axial direction of the winding 13 in the region of the active regions 16 is greater than the thickness in the axial direction of the passive regions 17a, 17b. Adjacent to the active regions 16, the passive regions 17a, 17b have short radial regions 35 and 36, in which changes in the cross-section of the respective winding 13 occur, each of which can also be accompanied by a change in plane. Such transition areas can also be located in the active regions 16.

The active regions 16 have a fanned out geometry. That is, in the radial direction from the inside to the outside, the width in the tangential direction of the winding 13 in the active regions 16 increases, i.e., the width in the tangential direction of the winding 13 in the active regions 16 has a minimum value 38 at the radially innermost point adjacent to the inner cross-sectional change 35 and a maximum value 40 at the radially outermost point adjacent to the outer cross-sectional change 36. The width of the winding in the cross-sectional changes 35, 36 can be within and/or outside these values. The thickness in the axial direction of the winding in the active regions 16 decreases in the radial direction from the inside to the outside, i.e., assumes a maximum value 42 at the radially innermost point adjacent to the inner cross-sectional change 35 and a minimum value 44 at the radially outermost point adjacent to the outer cross-sectional change 36. In the cross-sectional changes 35, 36, the thickness of the winding can be within and/or outside these values. The cross-sectional area of the winding 13 in the active regions 16 remains substantially constant along the radial direction.

This form of winding with the fanned out active regions 16 advantageously can be combined with the recess shown in FIG. 8C, i.e. the "V-cooling geometry". This is exemplarily shown in FIG. 10.

FIG. 10 shows a sectional view through a coil module 18. The coil module includes first and second coil discs 6, each having windings 13 that have the fanned out geometry shown in FIGS. 9A and 9B. The first and second coil discs 6 each include a substantially annular recess 22, each extending from the inner cross-sectional changes 35 of the windings 13 to the outer passive regions 17b of the windings. Between the cross-sectional changes 35 and 36, the depth of the recesses 22 continuously increases from radially inside to radially outside so that the recesses have the so-called "V-cooling" geometry.

In the present case, both the first and the second coil disc 6 have a recess 22 which, in the assembled state of the coil module 18, are exactly opposite each other and thus confine and form the cooling channel 23.

Figure 11A:
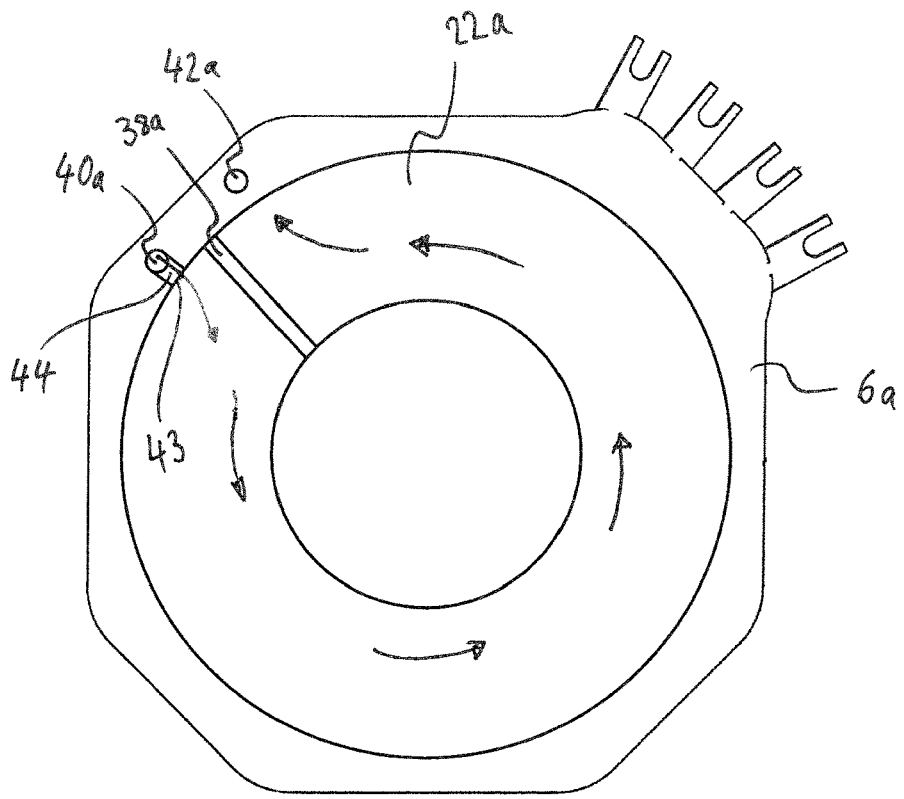
FIGS. 11A, 11B show top views of first and second coil discs.
Figure 11B:
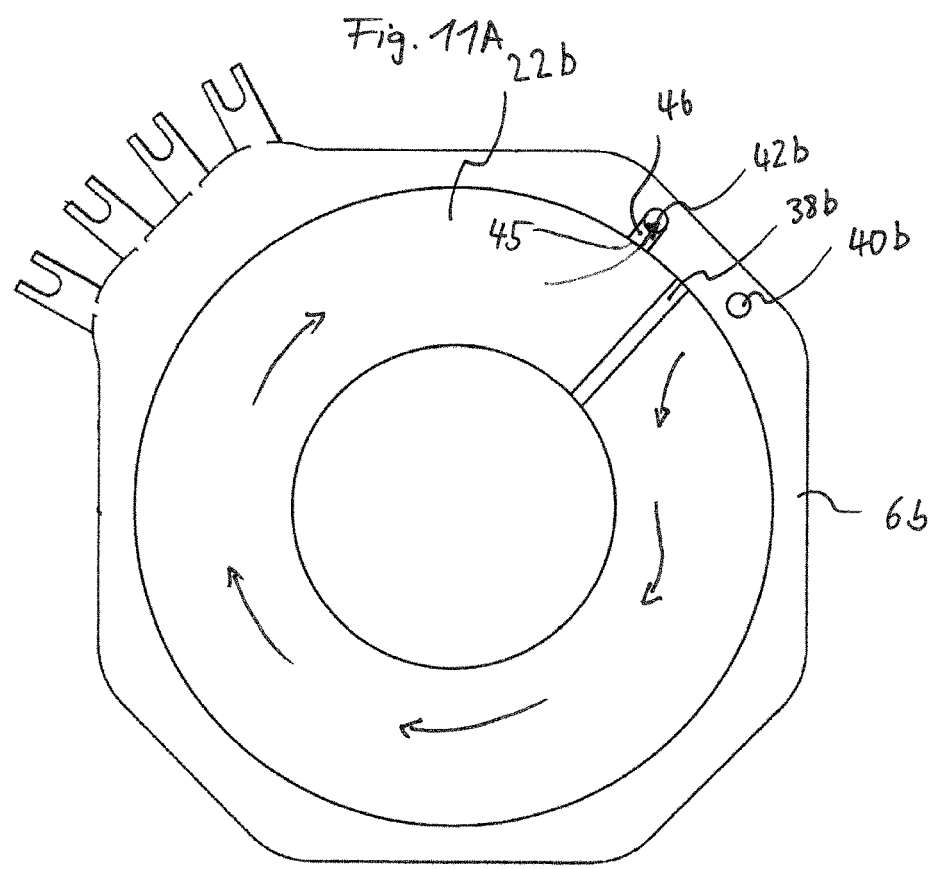

FIGS. 11A and 11B each show a top view of the inner side of a first coil disc 6a and a second coil disc 6b, which are intended to be assembled into a coil module. For the sake of clarity, the windings are not shown in these Figures. The first coil disc 6a and the second coil disc 6b each comprise a substantially annular recess 22a, 22b. Furthermore, a bar and/or rib 38a is formed in the recess 22a and a bar and/or rib 38b is formed in the recess, the upper surface of each of which lies in the same plane as the remaining inner surface of the coil disc 6a, 6b (i.e., apart from the recess 22a, 22b).

The first coil disc 6a further includes an inlet hole 40a, an inlet channel 44 and an outlet hole 42a. The inlet channel 44 forms an inlet opening 43 in the side surface of the recess 22a. The second coil disc 6b has an inlet hole 40b, an outlet hole 42b and an outlet channel 46 that forms an outlet opening 45 in the side surface of the recess 22b.

This arrangement allows the coolant in the assembled state of the coil module to flow through the inlet hole 40a, b, the inlet channel 44, the inlet opening 43 into the coolant channel formed by the recesses 22a, 22b and then through the outlet opening 45 into the outlet channel 46 and the outlet hole 42a, b as visualized by means of arrows.

The electric machine typically has a plurality of such coil modules connected to each other by coil spacers. The coil spacers comprise respective inlet and outlet holes so that, in the assembled state, all inlet holes are located on one line and all the outlet holes are located on one line. In the coil module or in the spacer that is located at an axial end of the electric machine, the inlet and outlet holes can be omitted. Through the inlet and outlet holes in the coil module or spacer that is located at the opposite axial end of the electric machine, the coolant can be supplied and discharged.

Figure 12A:
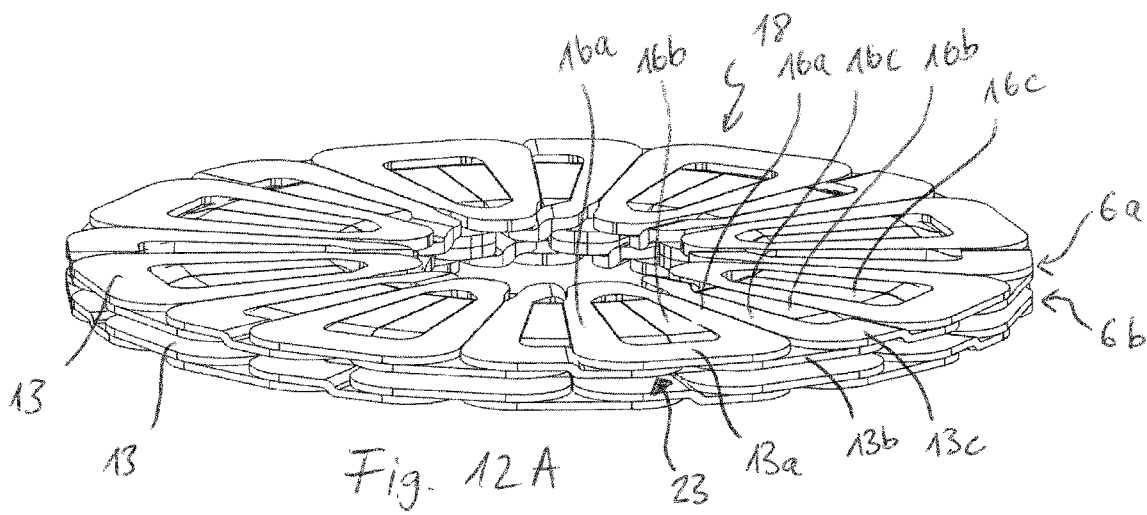
FIG. 12A shows a perspective view of a coil module.
Figure 12B:
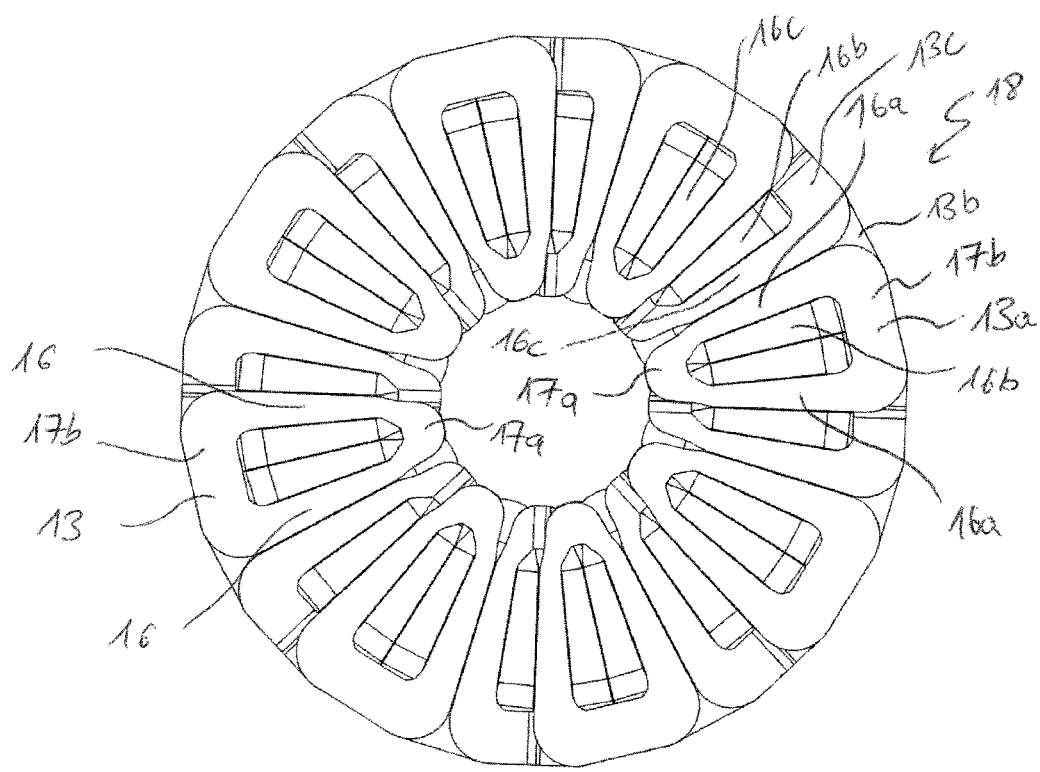
FIG. 12B shows a top view of the coil module shown in FIG. 12A.
Figure 12C:
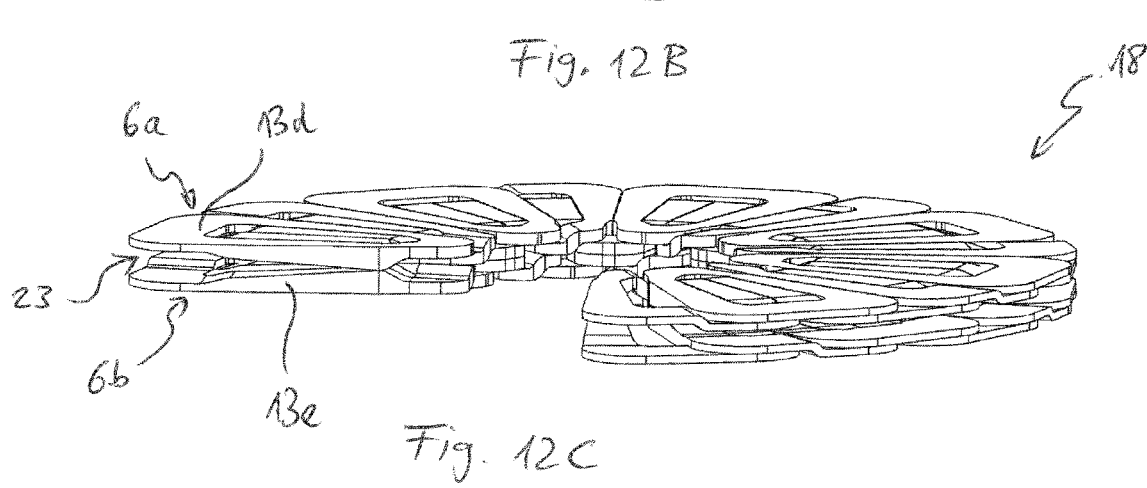
FIG. 12C shows a perspective view of part of the coil module shown in FIG. 12A.

FIGS. 12A, 12B, and 12C illustrate a coil module by means of which the "fanning out" of the active regions and the "V-cooling" disclosed herein are explained.

FIG. 12A depicts a perspective view of the coil module 18. The coil module comprises a first coil disc 6a and a second coil disc 6b. The first coil disc 6a and the second coil disc 6b are attached to each other such that their respective inner sides are opposite each other. The two recesses 22a, 22b respectively provided on the inner sides thus face each other or lie on each other so that they form a cooling channel 23 between the coil discs 6a, 6b.

The first coil disc 6a and the second coil disc 6b each comprise a plurality of windings 13. These windings 13 of each coil disc 6a, 6b can have different configurations. A first group of windings 13a lie in a first plane so that both the active regions 16a and the passive regions lie in the first plane. A second group of windings 13b is arranged such that the tangential regions lie in a second plane which is offset from the first plane, and the active regions 16b lie in the first plane. At the transitions to the active regions 16b, the plane change occurs. A third group of windings 13c is arranged such that the tangential regions lie in both the first plane and the second plane so that a plane change occurs in the tangential regions.

Additionally, a plane change occurs from the portion of the tangential region that lies in the second plane to the active region 16c that lies in the first plane. In this way, all active regions 16a, 16b and 16c of each one of the coil discs 6a, 6b lie in a first plane.

FIG. 12B shows a top view of the coil module 18. As disclosed herein, the windings comprise active regions 16 and passive regions 17a, 17b. It is readily apparent that the active regions 16 of the windings 13 have the fanned-out shape described herein.

Furthermore, the windings 13a, 13b and 13c illustrated in FIG. 12A are depicted. It is readily apparent that their adjacent active regions 16a, 16b, 16 substantially abut each other so that there is preferably no gap.

FIG. 12C shows a perspective view of the coil module 18 in which some of the windings have been omitted so that the channel 23 between the first coil disc 6a and the second coil disc 6b is clearly visible. That is, a space is formed between the windings 13d of the first coil disc 6a and the windings 13e of the second coil disc, said space increasing in axial height (or thickness in the axial direction) from radially inside to radially outside.

Figure 13:
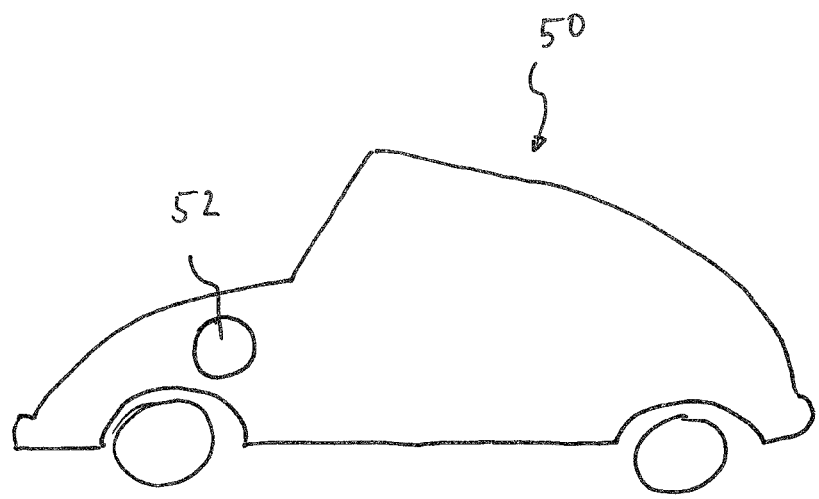
FIG. 13 shows a vehicle.

FIG. 13 shows a vehicle 50 comprising an electric machine 52 as disclosed within the scope of the present application.

Figure 14:
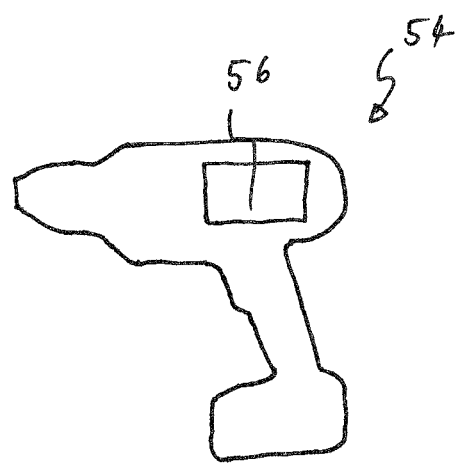
FIG. 14 shows a machine tool.

FIG. 14 shows a machine tool 54 comprising an electric machine 56 as disclosed within the scope of the present application.

Features of the various embodiments disclosed only in the exemplary embodiments can be combined with each other and individually claimed.

The invention claimed is:

1. A coil module for an electric machine, comprising:
   a first coil disc having at least one winding of an electrically conductive material;
   a second coil disc having at least one winding of an electrically conductive material;
   wherein the first coil disc and/or the second coil disc comprise/comprises a substantially annular recess;
   wherein the first coil disc and the second coil disc are attached to each other such that a substantially annular cooling channel for a coolant is formed between the first coil disc and the second coil disc by the substantially annular recesses/recess.

2. The coil module according to claim 1, wherein the first coil disc and/or the second coil disc comprises an inlet opening in the region of the recess for conducting coolant into the substantially annular cooling channel; and/or
   wherein the first coil disc and/or the second coil disc comprises an outlet opening in the region of the recess for conducting coolant from the substantially annular cooling channel to the outside.

3. The coil module according to claim 2, wherein the first coil disc and/or the second coil disc comprises a bar and/or rib in the recess between the inlet opening and the outlet opening, the bar and/or rib being configured such that the substantially annular cooling channel comprises a dividing wall between the inlet opening and the outlet opening.

4. A coil module according to claim 1, wherein the first coil disc and the second coil disc each comprise:
   at least one a coil carrier made of an electrically insulating material and a plurality of individual windings made of an electrically conductive material and being circumferentially arranged on the at least one coil disc around a center (14) of the at least one coil disc, wherein each of the windings comprises two active regions extending radially from the center and two passive regions extending tangentially at its radially outer and inner edges, and in a top view of the coil disc, the active regions of different windings do not overlap each other, but each passive region of one of the windings partially overlaps the corresponding passive regions of the two directly adjacent windings, characterized in that, in the active regions, the respective winding in cross-section has a greater thickness in the axial direction than in the passive regions.

5. The coil module according to claim 4, wherein the recesses/recess are/is arranged at least in the region of the radially extending active regions and preferably also in the region of the radially outer passive regions.

6. The coil module according to claim 5, wherein the thickness in the axial direction of the active regions of the respective winding of the first and/or second coil disc decreases in the radial direction towards the outside; and wherein the width in the tangential direction of the active regions of the respective winding of the first and/or second coil disc increases in the radial direction towards the outside.

7. The coil module according to claim 6, wherein a depth in the axial direction of the recess increases in the region of the active regions in the radial direction towards the outside.

8. The coil module according to claim 4, wherein a ratio of the thickness of the respective winding in the passive regions to the thickness in the active regions is less than 1;

wherein the ratio of the thickness of the respective winding in the passive regions to the thickness in the active regions is preferably greater than or equal to 0.3 and less than 1.

9. The coil module according to claim 4, wherein the shape of the cross-sectional area of the respective winding changes at a transition from an active region to a passive region.

10. The coil module according to claim 4, characterized in that all active regions of different windings are arranged in a single plane in a side view.

11. The coil module according to claim 4, characterized in that the windings are formed from a fine strand of a plurality of wires being electrically insulated from each other and having a wire diameter of less than or equal to 0.1 mm.

12. The coil module according to claim 4, characterized in that a number of the windings corresponds to an integer multiple of three so that the windings enable a three-phase operation.

13. The coil module according to claim 4, characterized in that an inner passive region and an outer passive region of one of the windings differ in thickness in the axial direction;

wherein the thickness of the outer passive region of one of the windings is preferably selected such that a ratio of the thickness of this region to the thickness of the active regions is less than or equal to 0.5.

14. An electric machine comprising a bearing arrangement and a shaft guided in the bearing arrangement, wherein at least one magnet module comprising a plurality of permanent magnets and at least one coil module according to claim 1 are concentrically arranged along the shaft.

15. A vehicle or a machine tool comprising an electric machine according to claim 14.

* * * * *